(12) United States Patent
Ikeda

(10) Patent No.: US 10,939,002 B2
(45) Date of Patent: Mar. 2, 2021

(54) PRINTING APPARATUS, CONTROL METHOD THEREFOR, AND PROGRAM

(71) Applicant: CANON KABUSHIKI KAISHA, Tokyo (JP)

(72) Inventor: Tom Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 15/499,227

(22) Filed: Apr. 27, 2017

(65) Prior Publication Data

US 2017/0331965 A1    Nov. 16, 2017

(30) Foreign Application Priority Data

May 10, 2016   (JP) .............................. JP2016-094571

(51) Int. Cl.
| | |
|---|---|
| *H04N 1/00* | (2006.01) |
| *G06F 3/12* | (2006.01) |
| *G06Q 30/02* | (2012.01) |
| *G09F 23/00* | (2006.01) |

(52) U.S. Cl.
CPC ....... *H04N 1/00464* (2013.01); *G06F 3/1204* (2013.01); *G06F 3/1238* (2013.01); *G06F 3/1287* (2013.01); *G06Q 30/0241* (2013.01); *G09F 23/00* (2013.01); *H04N 1/00244* (2013.01); *H04N 1/00973* (2013.01); *G06F 3/1222* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0035144 A1* | 2/2003 | Shima ................... | G06F 3/1206 358/1.18 |
| 2005/0114766 A1* | 5/2005 | Yamamoto .......... | G06F 16/9577 715/277 |
| 2010/0010898 A1* | 1/2010 | Matsumoto ............ | G06Q 30/02 705/14.58 |
| 2012/0158524 A1* | 6/2012 | Hintz ................. | G06Q 30/0277 705/14.73 |
| 2014/0198341 A1* | 7/2014 | Nakayama ............ | G06F 3/1222 358/1.15 |
| 2015/0002888 A1* | 1/2015 | Tsujimoto ............ | G03G 15/502 358/1.14 |
| 2016/0036999 A1* | 2/2016 | Kaye ..................... | G06F 3/1204 358/1.13 |
| 2016/0065760 A1* | 3/2016 | Aso ..................... | H04N 1/00342 358/1.14 |

FOREIGN PATENT DOCUMENTS

| | | | |
|---|---|---|---|
| JP | 2005266421 A | * | 9/2005 |
| JP | 2011141684 A | | 7/2011 |
| JP | 2012-134755 A | | 7/2012 |
| JP | 2013021662 A | | 1/2013 |
| JP | 2013228897 | * | 11/2013 |
| JP | 2014138298 A | | 7/2014 |
| JP | 2015099450 A | | 5/2015 |
| JP | 2015185100 A | | 10/2015 |

* cited by examiner

*Primary Examiner* — Fan Zhang
(74) *Attorney, Agent, or Firm* — Canon U.S.A., Inc. IP Division

(57) ABSTRACT

A printing apparatus for registering a web content item to be displayed, corresponding to a login event, displays the registered web content item at time of receiving the login event.

15 Claims, 8 Drawing Sheets

FIG. 5

501 — PATH OF CONTENT DISPLAYED AFTER LOGIN
http://xxx.xxx.xxx/folder/notice.html 502 — PATH OF CONTENT DISPLAYED AFTER LOGOUT
http://xxx.xxx.xxx/folder/new_product.gif 503 — PATH OF CONTENT DISPLAYED UPON STARTING PRINTING
http://xxx.xxx.xxx/folder/event.jpg 504 — PATH OF CONTENT MANAGEMENT TABLE
http://xxx.xxx.xxx/folder/setting.conf

[SETUP]

FIG. 6

| TYPE OF EVENT | PATH OF WEB CONTENT |
|---|---|
| 601 — Login, | http://xxx.xxx.xxx/folder/notice.html |
| 602 — Logout, | http://xxx.xxx.xxx/folder/new_product.gif |
| 603 — Print, | http://xxx.xxx.xxx/folder/event.jpg |

CHERRY BLOSSOM VIEWING EVENT IS NOW IN PROGRESS!

SEASON FOR CHERRY BLOSSOMS HAS COME. SO WE WILL HOLD ANNUAL CHERRY BLOSSOM VIEWING EVENT. PLEASE JOIN US.

1. PERIOD
    MM/DD/2016 TO MM/DD/2016

2. PLACE
    GREEN AREA IN FRONT OF BLDG. B

3. PARTICIPATION FEE
    xxxx YEN

4. CONTACT
    PERSONNEL SECTION

CLOSE

LOGOUT

PRINTING APPARATUS, CONTROL METHOD THEREFOR, AND PROGRAM

BACKGROUND OF THE INVENTION

Field of the Invention

The present invention relates to a printing apparatus, a control method therefor, and a program.

Description of the Related Art

Conventionally, an image processing apparatus, such as a multifunction peripheral, has a bulletin board function to display a pre-registered message on a screen to show a notification from an administrator (Japanese Patent Laid-Open 2012-134755). Thereby, a user may be notified of maintenance information of the image processing apparatus or an internal notification.

Furthermore, in recent years, "digital signage" which transmits information using a display connected to a network has been widely used outdoors, in front of a store, in a public space, or in vehicles. The digital signage has also attracted attention for use in company office for example to support information sharing between employees or information control in company.

In the conventional bulletin board function of the image processing apparatus, information to be displayed is limited in type to character information, and further limited in time of displaying the information. Meanwhile, the multifunction peripheral is a terminal used several times a day, and requires a job waiting time for example during printing, and thus, the multifunction peripheral is desired to be effectively used for signage in office. In order to effectively use the multifunction peripheral to perform the function as the signage, a mechanism for showing appropriate information to the user at appropriate time is demanded.

There is a need in the art to provide an image processing apparatus which can display web content items associated with a plurality of specific events generated in an image processing apparatus.

SUMMARY OF THE INVENTION

In order to overcome the above mentioned issues, the present disclosure provides a printing apparatus which includes an authentication unit configured to perform login to allow a user to log into the printing apparatus, a reception unit configured to receive a login event transmitted from the authentication unit and representing that the user logged into the printing apparatus, a registration unit configured to register a web content item to be displayed, corresponding to the login event, an acquisition unit configured to acquire a web content item registered corresponding to the login event by the registration unit, according to reception of the login event by the reception unit, and a display unit configured to display the web content item acquired by the acquisition unit.

Further features of the present invention will become apparent from the following description of exemplary embodiments (with reference to the attached drawings).

BRIEF DESCRIPTION OF THE DRAWINGS

FIG. 5 is a diagram illustrating an example of a web content registration screen according to an embodiment of the present invention.

FIG. 6 is a diagram illustrating an example of a content management table 306 according to an embodiment of the present invention.

DESCRIPTION OF THE EMBODIMENTS

Embodiments of the present invention will be described below with reference to the drawings.

Figure 1:
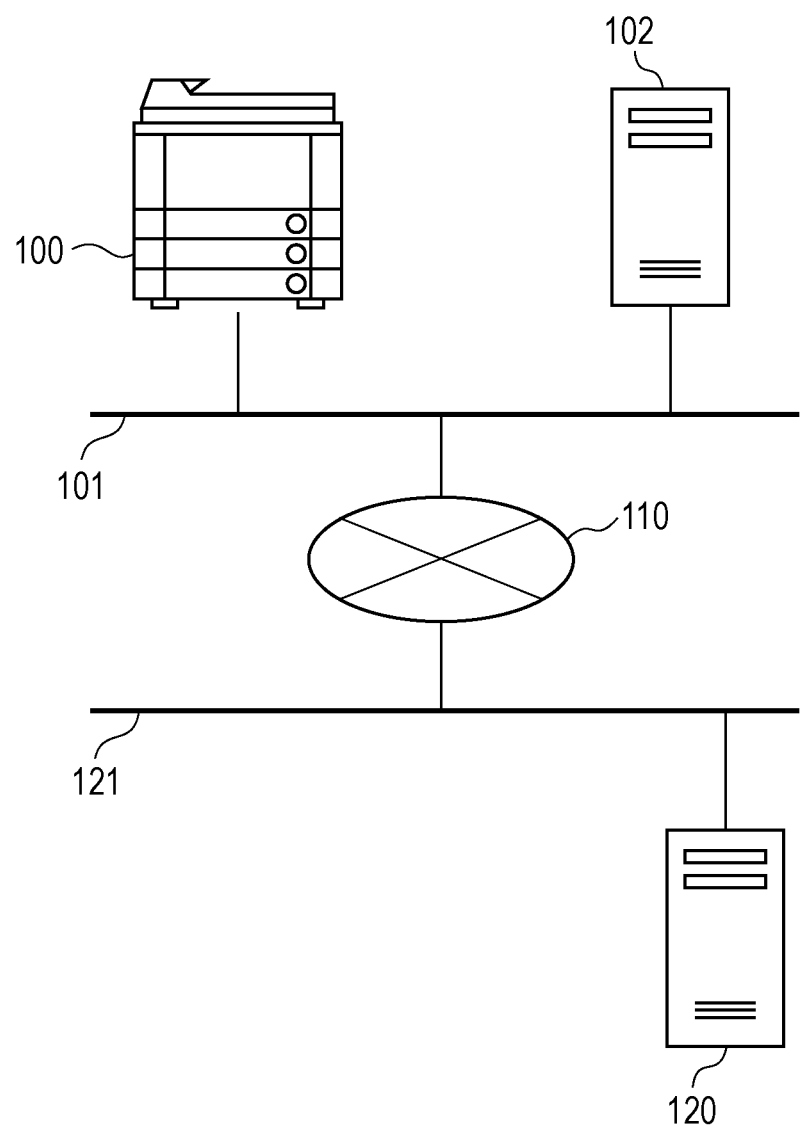
FIG. 1 is an overall diagram of a system according to an embodiment of the present invention.

FIG. 1 is an overall diagram of an image processing system according to an embodiment of the present invention. An image processing apparatus 100 is connected to the Internet 110 through a LAN 101. A client PC 102 is connected to the image processing apparatus 100 through the LAN 101. A content server 120 stores various web content items, and is connected to the Internet 110 through a LAN 121. The image processing apparatus 100 can acquire a web content item described later from the content server 120 through the Internet 110. Note that, here, description is made of an example employing one image processing apparatus 100, client PC 102, and content server 120, but a plurality of image processing apparatuses 100, client PCs 102, and content servers 120 may be employed.

Figure 2:
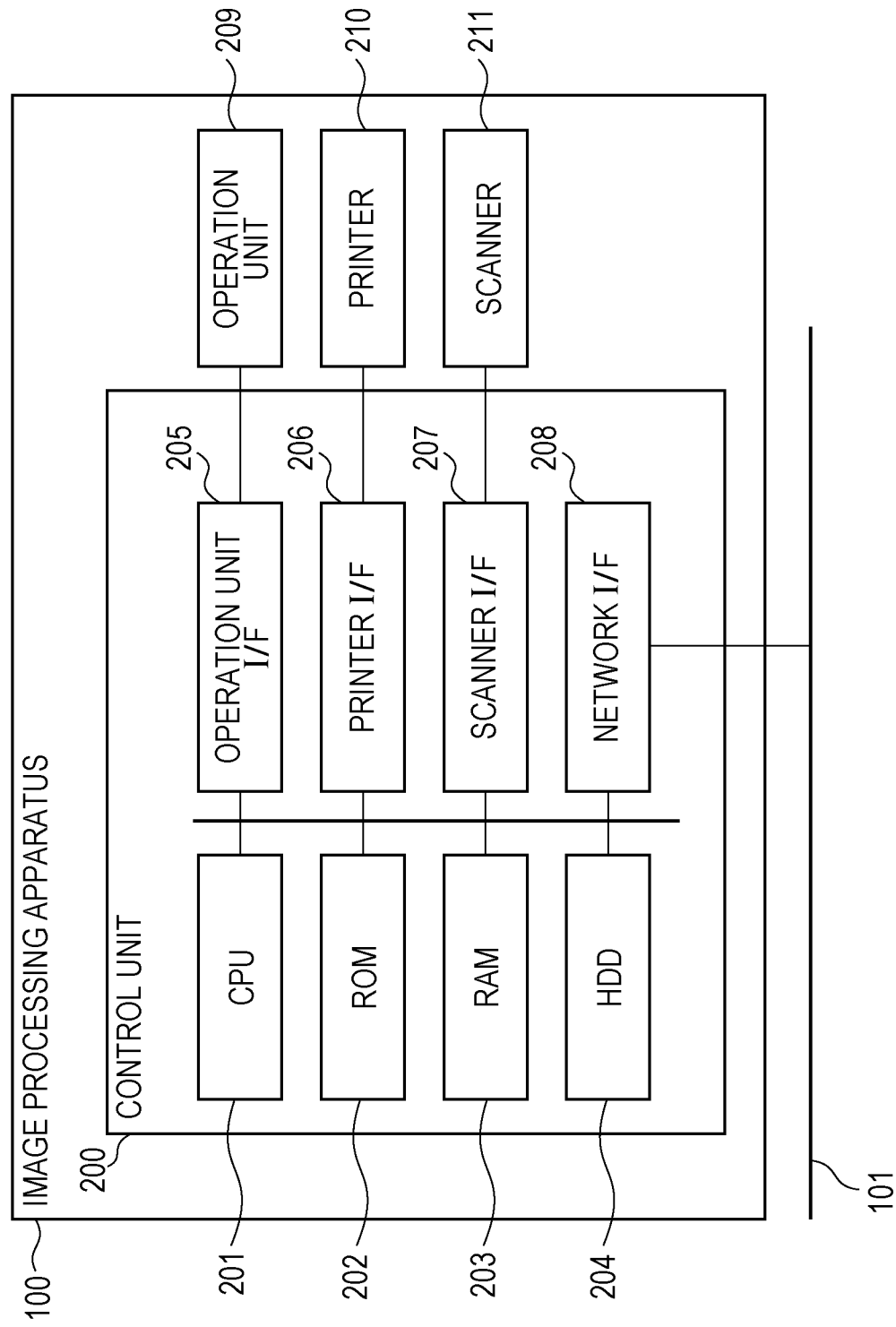
FIG. 2 is a block diagram illustrating a hardware configuration of an image processing apparatus according to an embodiment of the present invention.

FIG. 2 is a block diagram illustrating a configuration of the image processing apparatus 100 according to an embodiment of the present invention. A control unit 200 including a CPU 201 controls operation of the whole image processing apparatus 100. The CPU 201 reads a control program stored in a ROM 202 to perform various control such as reading control and transmission control. The ROM 202 is a boot ROM, and stores a boot program of the system. A RAM 203 is used as a temporary storage area such as a main memory or a work area for the CPU 201. An HDD 204 stores image data, various programs, or various information tables. Furthermore, the HDD 204 can store web content items described later. An operation unit I/F 205 is an interface for connecting an operation unit 209 and the control unit 200 to each other. The operation unit 209 includes a liquid crystal display having a touch panel function, a keyboard, and the like.

A printer I/F 206 is an interface for connecting a printer 210 and the control unit 200 to each other. Image data to be printed by the printer 210 is transmitted from the control unit 200 through the printer I/F 206, and printed on a recording medium (on a paper sheet) at the printer 210.

A scanner I/F 207 is an interface for connecting a scanner 211 and the control unit 200 to each other. The scanner 211 reads an image on a document to generate image data, and inputs the image data to the control unit 200 through the scanner I/F 207.

A network I/F 208 is an interface for connecting the control unit 200 to the LAN 101. The network I/F 208 transmits and receives information to and from an external device connected to the Internet 110 through the LAN 101.

Figure 3:
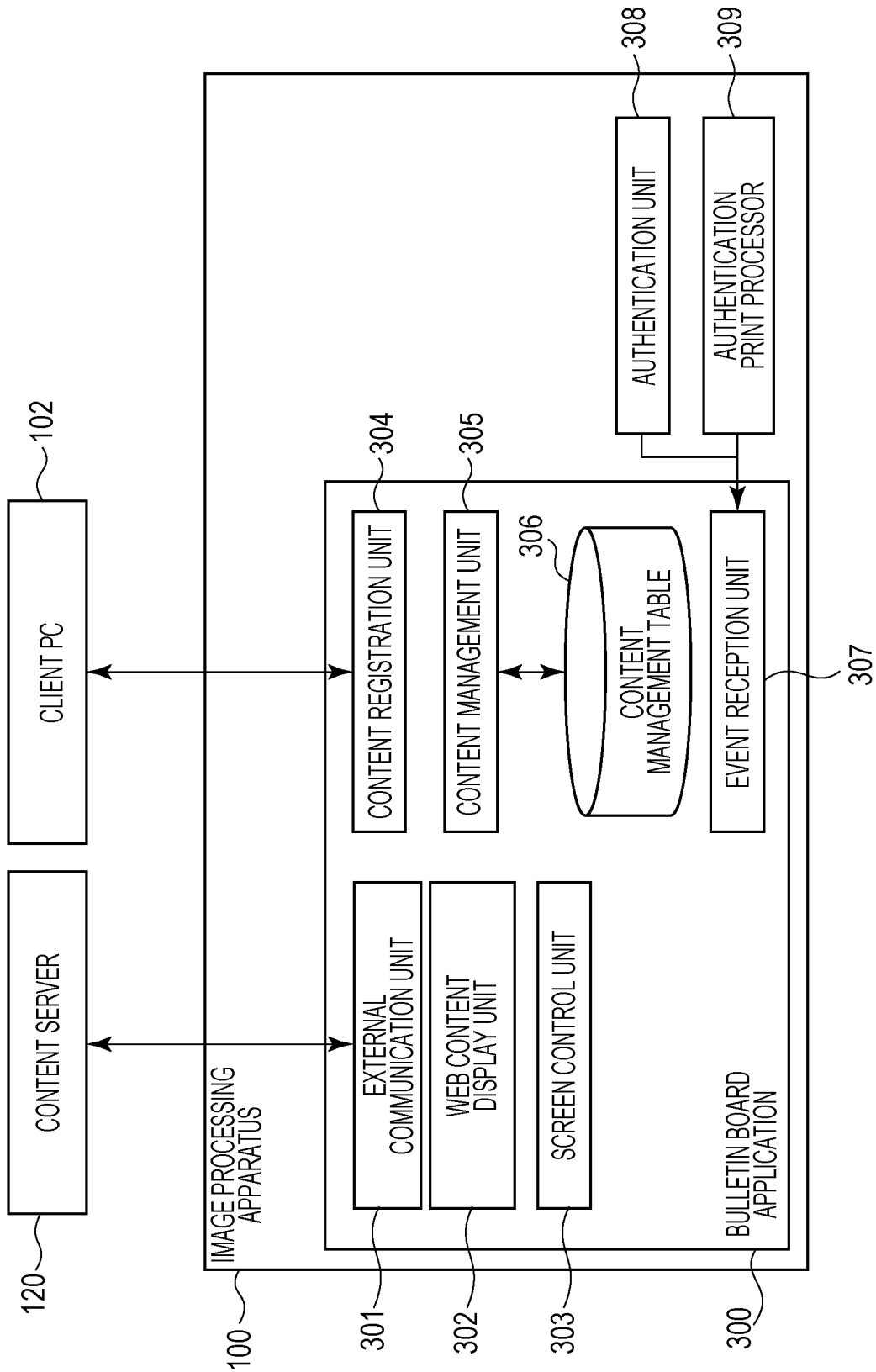
FIG. 3 is a block diagram illustrating a software configuration of an image processing apparatus according to an embodiment of the present invention.

FIG. 3 is a diagram illustrating a software configuration of the whole system including the image processing apparatus 100. Each functional unit illustrated in FIG. 3 is achieved by reading a control program stored in the ROM 202 or the HDD 204 and executing the control program by the CPU 201 in the image processing apparatus 100.

The image processing apparatus 100 functions as a bulletin board application 300, an authentication unit 308, and an authentication print processor 309.

The bulletin board application 300 is a built-in software program installed in the image processing apparatus 100. The bulletin board application 300 includes an external communication unit 301, a web content display unit 302, a screen control unit 303, a content registration unit 304, a content management unit 305, content management table 306, and an event reception unit 307.

The external communication unit 301 communicates with the content server 120 to acquire a web content item or a content management table managed in the content server 120. The web content display unit 302 loads a web content item stored in the content server 120 or the HDD 204 into the RAM 203, and outputs the web content item to the operation unit 209. The web content item represents data which can be viewed by a web browser, such as text data, HTML, an image file (JPEG, GIF, or the like), or a moving image file. The screen control unit 303 switches screens managed for applications, and outputs a screen on the operation unit 209.

The content registration unit 304 registers a web content item to be displayed in association with a type of specific event received by the event reception unit 307. Specifically, a web browser of the client PC 102 is used to access a web server of the image processing apparatus 100, and cause the user to register a web content item to be displayed upon generation of the specific event.

FIG. 5 is a diagram illustrating an example of a screen for registering web content items. As described above, the web browser of the client PC 102 is used to access the web server of the image processing apparatus 100, and the screen of FIG. 5 is displayed.

An input field 501 inputs a path of a web content item displayed upon login of the user into the image processing apparatus 100. The path represents a storage location of a web content item, and has a computer name, a folder name, a file name, and the like separated by / (slash). For the web content item, a file stored in the HDD 204 or a file stored in the content server 120 may be designated. An input field 502 inputs a path of a web content item displayed upon logout of the user from the image processing apparatus 100. An input field 503 inputs a path of a web content item displayed upon performance of printing in the image processing apparatus 100.

An input field 504 inputs a path of the content management table 306 (described later) generated/updated on the basis of the contents input into 501 to 503.

As described above, the user can register identification information identifying a web content item to be displayed, corresponding to the type of event representing time of displaying the web content item, through the registration screen illustrated in FIG. 5. Note that, here, description is made of an example of registration of the web content item from the client PC 102, but the operation unit 209 of the image processing apparatus 100 may be used to perform registration.

Returning to FIG. 3, the description will be continued. The content management unit 305 stores the paths of the web content items in the content management table 306, on the basis of the contents registered from the content registration unit 304. Furthermore, the content management unit 305 acquires a path of a web content item from the content management table 306, and transmits the path the web content display unit 302. The content management table 306 is a management table managing paths of web content items associated with the types of events.

FIG. 6 is a diagram illustrating an example of the content management table 306. Here, the content management table 306 is illustrated which is generated/updated on the basis of the contents input through the registration screen illustrated in FIG. 5.

A path of a web content item 601 is displayed upon receiving a login event. A path of a web content item 602 is displayed upon receiving a logout event. A path of a web content item 603 is displayed upon receiving an authentication printing event representing start of authentication printing.

The content management unit 305 can refer to the content management table 306 to acquire a path of a web content item associated with the type of received event. Here, the content management table 306 may be stored in the HDD 204 of the image processing apparatus 100 or the content server 120.

Returning to FIG. 3, the description will be continued. The event reception unit 307 receives various events transmitted from the authentication unit 308 or the authentication print processor 309.

The authentication unit 308 performs user authentication using authentication information such as a user ID or a password input by the user through the operation unit 209, and when the user authentication results in success, login is performed to allow the user to log into the image processing apparatus 100. Furthermore, when receiving a logout command, the authentication unit 308 performs logout to allow the login user to logout from the image processing apparatus. When the login or the logout is performed, the authentication unit 308 transmits an event (login event or logout event) representing performance of the login or the logout to the event reception unit 307.

The authentication print processor 309 manages print jobs received from the outside such as the client PC 102, for users, and displays a print job associated with a user logging into the image processing apparatus 100, on the operation unit 209. Then, when receiving a print command from a user through the operation unit 209, the authentication print processor 309 causes the printer 210 to perform printing. When printing is started on the basis of the print command from the user, the authentication print processor 309 transmits an event (authentication printing event) representing performance of authentication printing, to the event reception unit 307.

Figure 4:
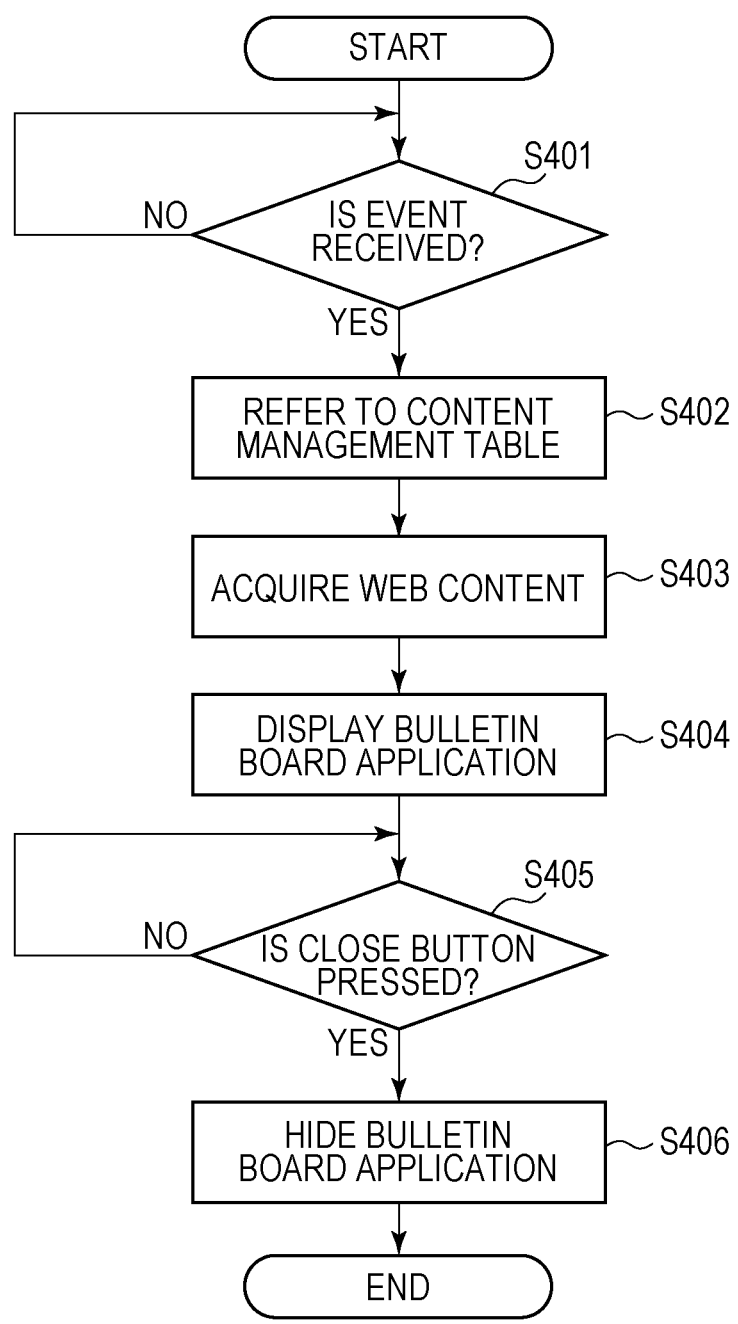
FIG. 4 is a flowchart illustrating a process according to an embodiment of the present invention.

FIG. 4 is a flowchart illustrating a display process of a web content item performed by the CPU 201.

In S401, the CPU 201 causes the event reception unit 307 to determine whether a specific event is received from the authentication unit 308 or the authentication print processor 309. When the CPU 201 determines reception of the specific event such as the login event, the logout event, or the authentication printing event, the process proceeds to S402. When the CPU 201 determines no reception of the specific event, the process returns to S401.

In S402, the CPU 201 causes the content management unit 305 to refer to the content management table 306, acquire a path of a web content item associated with the specific event received in S401, and transmit the path of the web content item to the web content display unit 302.

In S403, the CPU 201 causes the web content display unit 302 to acquire the web content item on the basis of the path acquired in S402, and load the web content item into the RAM 203.

In S404, the CPU 201 causes the screen control unit 303 to switch display to screen managed by the bulletin board application. On the screen managed by the bulletin board application, the web content item acquired in S403 is output by the web content display unit 302, and this web content item is displayed on the operation unit 209.

In S405, the CPU 201 determines whether the user presses a close button positioned on the bulletin board application, through the operation unit 209. When the CPU 201 determines that the close button is pressed, the process proceeds to S406. When the CPU 201 determines that the close button is not pressed, the process returns to S405.

In S406, the CPU 201 causes the screen control unit 303 to hide the screen managed by the bulletin board application.

FIGS. 7A to 7F are diagrams illustrating examples of screens displayed on the operation unit 209. An overview of transition of display screens according to the present embodiment will be described with reference to FIGS. 7A to 7F.

Figure 7A:
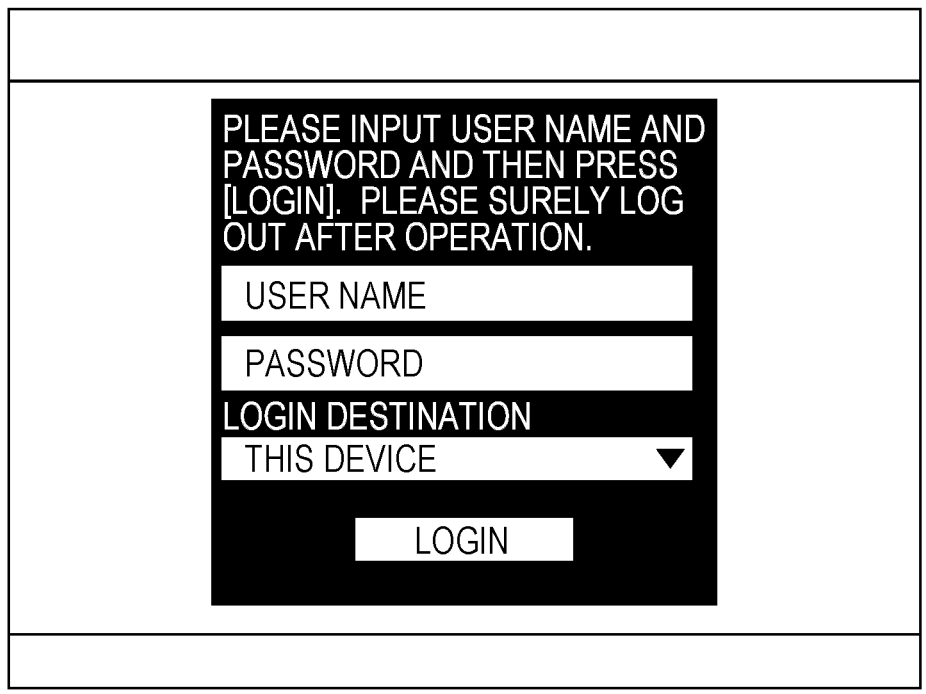
FIGS. 7A to 7F are diagrams illustrating examples of screens of an operation unit 209 according to an embodiment of the present invention.

FIG. 7A is a diagram illustrating an example of an authentication screen used for inputting the authentication information. When the user inputs a user name and a password through this authentication screen and presses a login button, the authentication unit 308 performs user authentication and login. After the login, the screen control unit 303 switches the authentication screen to a screen of FIG. 7B, and outputs the screen on the operation unit 209.

Figure 7B:
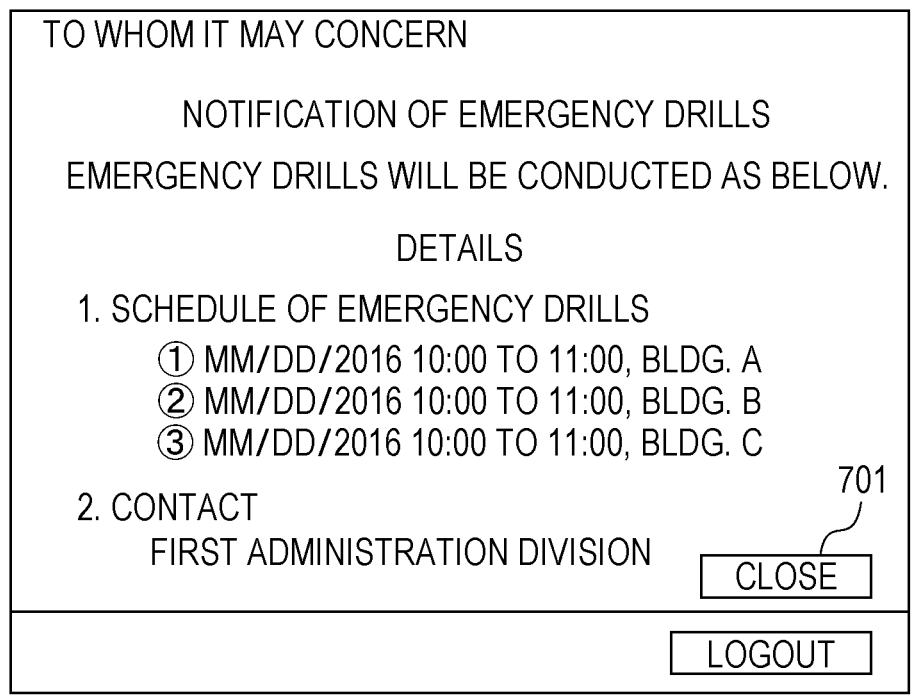

FIG. 7B is a diagram illustrating an example of a screen on which a web content item associated with the login event is displayed by the bulletin board application 300. Here, an HTML file indicated by "http://xxx.xxx.xxx/folder/notice.html" is displayed, from the content management table 306 of FIG. 6. In this way, after login, information is forcibly shown to the user, so that important information can be given entirely. Furthermore, when the user presses a close button 701, the screen control unit 303 hides the bulletin board application 300, and the screen transitions to a screen illustrated in FIG. 7C.

Figure 7C:
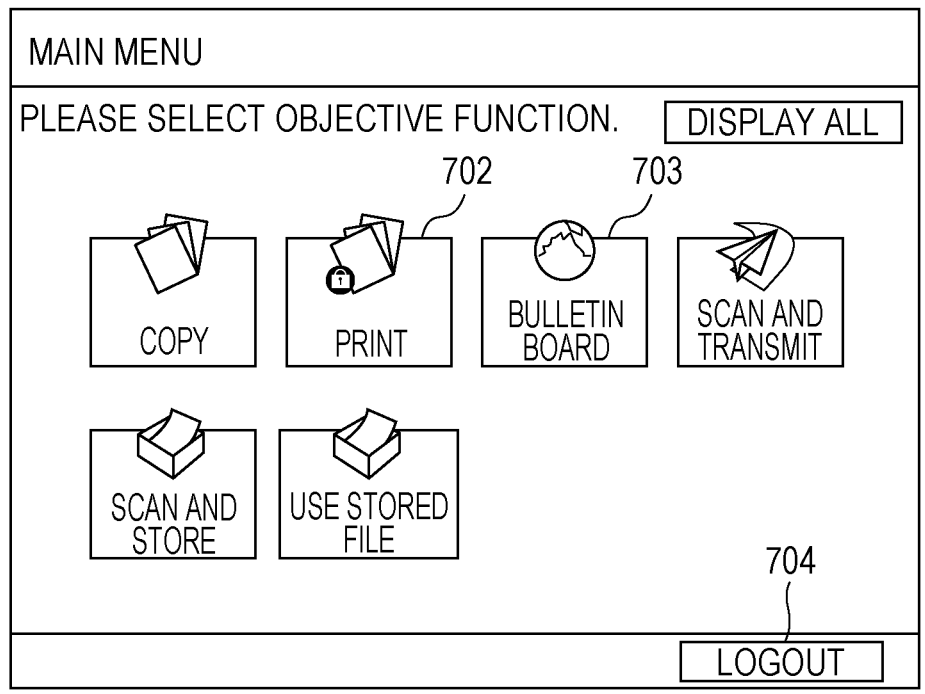

FIG. 7C is a diagram illustrating an example of a main menu screen used for selecting a desired function from the plurality of functions of the image processing apparatus 100. When the user presses a logout button 704, logout is performed by the authentication unit 308. After the logout, the screen control unit 303 switches the main menu screen to a screen displayed in FIG. 7D, and outputs the screen on the operation unit 209.

Figure 7D:
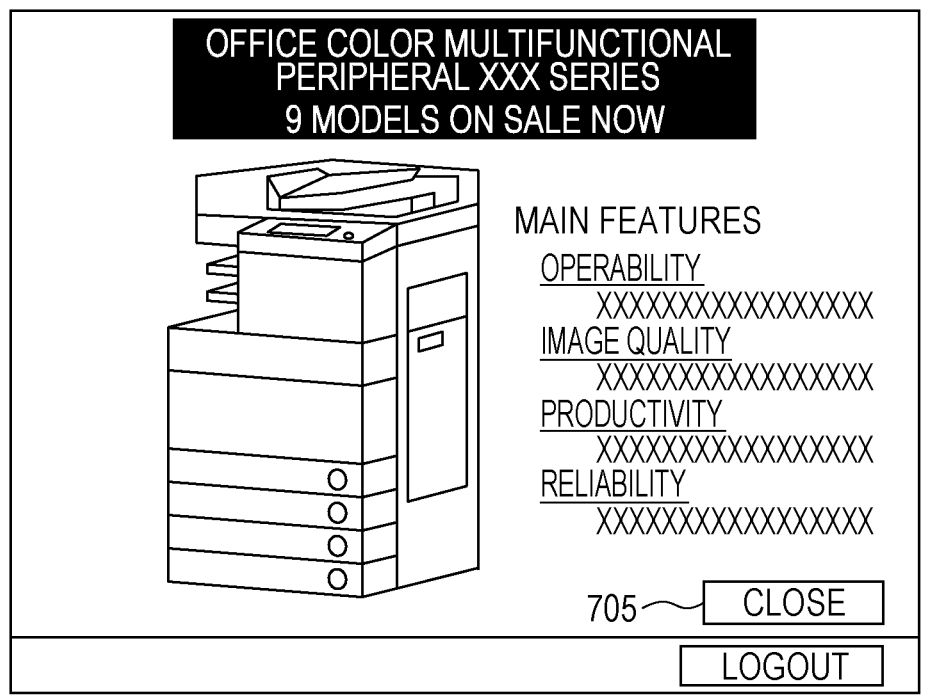

FIG. 7D is a diagram illustrating an example of a screen on which a web content item associated with the logout event is displayed by the bulletin board application 300. Here, an image file indicated by "http://xxx.xxx.xxx/folder/new_product.gif" is displayed, from the content management table 306 of FIG. 6. In this way, after logout, advertisement or the like is displayed, and the image processing apparatus 100 during waiting time can be used as an advertisement terminal. Furthermore, when the user presses a close button 705, the screen control unit 303 hides the bulletin board application 300, and the screen transitions to the authentication screen illustrated in FIG. 7A.

In the main menu screen of FIG. 7C, a print button 702 is a button for using the function of the authentication print processor 309. When the print button 702 is pressed by the user, the screen control unit 303 switches the main menu screen to a screen of FIG. 7E, and outputs the screen on the operation unit 209.

Figures 7E, 7F:

FIG. 7E is a diagram illustrating an example of a print settings screen for using the function of the authentication print processor 309. The print settings screen displays a print job associated with a login user. When the user presses a print start button after selecting a desired print job, the printer 210 starts printing. Furthermore, when the printing is started, the screen control unit 303 switches the print settings screen to a screen of FIG. 7F, and outputs the screen on the operation unit 209.

FIG. 7F is a diagram illustrating an example of a screen on which a web content item associated with the authentication printing event is displayed by the bulletin board application 300. Here, an image file indicated by "http://xxx.xxx.xxx/folder/event.jpg" is displayed from the content management table 306 of FIG. 6. In this way, during printing, a notification or the like is displayed, and the user's wait time for printout can be effectively used.

A bulletin board button 703 of FIG. 7C is a button for reconfirmation of a display content of the bulletin board application 300. When the bulletin board button 703 is pressed, the last screen of the bulletin board application 300 is displayed. For example, when the bulletin board button 703 is pressed, after the screen of FIG. 7B transitions to the screen of FIG. 7C according to pressing of the close button 701, the screen of FIG. 7B is displayed again. In this way, the bulletin board button 703 can be used for the user to redisplay information or the like which the user has missed, at desired time. Note that, when the bulletin board button 703 is pressed, a screen for selecting a desired web content item from the web content items associated with various event notifications may be displayed to display the web content item selected by the user. That is, the user may select any of screens of FIGS. 7B, 7D, and 7F for display.

As described above, according to the image processing apparatus 100 of the present embodiment, when web content items to be displayed are registered corresponding to a plurality of specific events, the registered web content items can be displayed at time of the specific events. In particular, for the specific events, different web content items can be registered as content to be displayed, so that appropriate information can be shown to the user at appropriate time, and information can be given to the user further effectively. Furthermore, the image processing apparatus 100 can be operated depending on office environment for use to support information sharing between employees or information control by a company.

Note that, in the present embodiment, the login, logout, and authentication printing are exemplified, but a web content item may be displayed at another event generated in the image processing apparatus 100. For example, the bulletin board application 300 may be displayed upon starting copying, upon starting performance of a function (scan and transmit function) for transmitting image data generated by the scanner to the outside, or upon starting use of a saved file. Furthermore, the bulletin board application 300 may be displayed, when a state of the image processing apparatus 100 is changed, including occurrence of maintenance requirement such as exhaustion of toner.

OTHER EMBODIMENTS

Note that, in the embodiment described above, the image processing apparatus 100 having a plurality of functions such as a copy function and a scanner function is described as an example, but the present invention can be also applied to an image processing apparatus only having part of the functions. Furthermore, the present invention may be applied to another information processing apparatus, such as a personal computer, a PDA, a cellular phone, a fax, a camera, a camcorder, or other image viewers.

According to the embodiments described above, an image processing apparatus can be provided which can display web content items associated with a plurality of specific events generated in the image processing apparatus.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-094571, filed May 10, 2016, which is hereby incorporated by reference herein in its entirety.

What is claimed is:

1. A system including an information processing apparatus and a printing apparatus, the information processing apparatus comprising:
a memory;
at least one processor in communication with the memory which executes the following:
displaying a setting screen for setting first web contents to be displayed after login to the printing apparatus second web contents to be displayed when the printing apparatus starts printing, and third web contents to be displayed after logout of the printing apparatus; and
receiving, via the setting screen, an instruction to register information indicating the first web contents to be displayed after login to the printing apparatus, information indicating the second web contents to be displayed when the printing apparatus performs printing and information indicating the third web contents to be displayed after logout of the printing apparatus, the printing apparatus comprising:
a memory; and
at least one processor in communication with the memory which executes the following:
detecting one of a login event of the printing apparatus, a print start event of the printing apparatus, and a logout event of the printing apparatus;
in a case where the detected event is the login event of the printing apparatus, based on the registered information indicating the first web contents, acquiring the first web contents and displaying a first screen including the acquired first web contents and not including an object for giving an instruction to redisplay of web contents;
in a case where the detected event is the print start event of the printing apparatus, based on the registered information indicating the second web contents, acquiring the second web contents and displaying a second screen including the acquired second web contents and not including an object for giving an instruction to redisplay of web contents;
displaying a main menu screen including an object for giving an instruction to redisplay web contents and an object for using a function of the printing apparatus in response to closing of the first screen including the first web contents or the second screen including the second web contents after displaying the first screen including the first web contents or the second screen including the second web contents;
redisplaying, which were displayed immediately before redisplay, and not displaying web contents, which were not displayed immediately before redisplay, in response to selection of the object for giving the instruction to redisplay the web contents included in the main menu screen,
in a case where the detected event is the logout event of the printing apparatus, acquiring the third web contents and displaying a third screen including the acquired third web contents and not including the object for giving the instruction to redisplay the web contents based on the registered information indicating the third web contents; and
displaying a screen displayed before the login to the printing apparatus in response to closing of a third screen including the third web contents after displaying the third screen including the third web contents,
wherein, in a case where the main menu screen is displayed by closing a first screen including the first web contents and where the object for giving the instruction to redisplay the web contents included in the main menu screen is selected, the contents that are redisplayed as the last-displayed contents are the first web contents, and
wherein, in a case where the main menu screen is displayed by closing a second screen including the second web contents and where the object for giving the instruction to redisplay the web contents included in the main menu screen is selected, the contents that are redisplayed as the last-displayed contents are the second web contents.

2. The system according to claim 1, wherein the first web contents is stored in the printing apparatus.

3. The system according to claim 1, wherein the first web contents is stored in an external server.

4. The system according to claim 1, further comprising registering a first web contents to be displayed, on the basis of information input using a web browser of an information processing apparatus connected to the printing apparatus through a network.

5. The system according to claim 1, further comprising:
performing login processing for allowing a user to log into the printing apparatus;
wherein a login event is received and indicates that the user has logged into the printing apparatus.

6. The system according to claim 5, further comprising:
performing logout processing for allowing the user to log out of the printing apparatus, and
receiving a logout event and indicating that the user has logged out of the printing apparatus.

7. The system according to claim 1, further comprising:
managing a print job received from an outside in association with a user and cause the printing apparatus to perform printing based on the print job associated with the user who has logged into the printing apparatus;
receiving a print event and indicating a start of the printing.

8. The system according to claim 1,
wherein the information processing apparatus displays a setting screen for setting the first web contents to be displayed after login to the printing apparatus, the second web contents to be displayed when the printing apparatus performs printing, and third web contents to be displayed after logout from the printing apparatus, and
wherein the information processing apparatus receives, via the setting screen, an instruction to register the information indicating the first web contents to be displayed after login to the printing apparatus, the information indicating the second web contents to be displayed when the printing apparatus performs printing, and information indicating the third web contents to be displayed after logout from the printing apparatus.

9. The system according to claim 8,
wherein the printing apparatus detects one of the login event to the printing apparatus, the print start event of the printing apparatus, and the logout event of the printing apparatus,
wherein the printing apparatus performs:
in a case where the detected event is the login event of the printing apparatus, based on the registered information indicating the first web contents, acquiring the first web contents and displaying the acquired first web contents;
in a case where the detected event is the print start event of the printing apparatus, based on the registered information indicating the second web contents, acquiring the second web contents and displaying the acquired second web contents;
in a case where the detected event is the logout event of the printing apparatus, based on the registered information indicating third web contents, acquiring the third web contents and displaying the acquired third web contents;
wherein the printing apparatus displays the main menu screen including the object for giving the instruction to redisplay the web contents in a case where the first screen including the first web contents or the second screen including the second web contents are closed; and
wherein the printing apparatus does not display the main menu screen including the object for giving the instruction to redisplay the web contents in a case where the third screen including the third web contents is closed.

10. A control method for a printing apparatus, the method comprising:
displaying a setting screen for setting first web contents to be displayed after login to the printing apparatus second web contents to be displayed when the printing apparatus starts printing, and third web contents to be displayed after logout of the printing apparatus;
receiving, via the setting screen, an instruction to register information indicating the first web contents to be displayed after login to the printing apparatus, information indicating the second web contents to be displayed when the printing apparatus performs printing and information indicating the third web contents to be displayed after logout of the printing apparatus;
detecting one of a login event of the printing apparatus, a print start event of the printing apparatus, and a logout event of the printing apparatus;
in a case where the detected event is the login event of the printing apparatus, based on the registered information indicating the first web contents, acquiring the first web contents and displaying a first screen including the acquired first web contents and not including an object for giving an instruction to redisplay of web contents;
in a case where the detected event is the print start event of the printing apparatus, based on the registered information indicating the second web contents, acquiring the second web contents and displaying a second screen including the acquired second web contents and not including an object for giving an instruction to redisplay of web contents;
displaying a main menu screen including an object for giving an instruction to redisplay web contents and an object for using a function of the printing apparatus in response to closing of the first screen including the first web contents or the second screen including the second web contents after displaying the first screen including the first web contents or the second screen including the second web contents;
redisplaying, which were displayed immediately before redisplay, and not displaying web contents, which were not displayed immediately before redisplay, in response to selection of the object for giving the instruction to redisplay the web contents included in the main menu screen,
in a case where the detected event is the logout event of the printing apparatus, acquiring the third web contents and displaying a third screen including the acquired third web contents and not including the object for giving the instruction to redisplay the web contents based on the registered information indicating the third web contents; and
displaying a screen displayed before the login to the printing apparatus in response to closing of a third screen including the third web contents after displaying the third screen including the third web contents,
wherein, in a case where the main menu screen is displayed by closing a first screen including the first web contents and where the object for giving the instruction to redisplay the web contents included in the main menu screen is selected, the contents that are redisplayed as the last-displayed contents are the first web contents, and
wherein, in a case where the main menu screen is displayed by closing a second screen including the second web contents and where the object for giving the instruction to redisplay the web contents included in the main menu screen is selected, the contents that are redisplayed as the last-displayed contents are the second web contents.

11. The control method according to claim 10, further comprising:
performing login processing for allowing a user to log into the printing apparatus;
wherein, in the receiving, a login event that indicates that the user has logged into the printing apparatus by performing the login processing is received.

12. The control method according to claim 11, further comprising:
performing logout processing for allowing the user to log out of the printing apparatus;
wherein, in the receiving, a logout event that indicates that the user has logged out of the printing apparatus by performing the logout processing is received.

13. The control method according to claim 10, further comprising:
authentication print processing of managing a print job received from an outside in association with a user and causing the printing apparatus to perform printing based on the print job associated with the user who has logged into the printing apparatus;
receiving a print event that indicates a start of the printing by the authentication print processing.

14. A non-transitory computer-readable storage medium storing a program for causing a computer to execute a control method for a printing apparatus, the control method comprising:
displaying a setting screen for setting first web contents to be displayed after login to the printing apparatus second web contents to be displayed when the printing apparatus starts printing, and third web contents to be displayed after logout of the printing apparatus;
receiving, via the setting screen, an instruction to register information indicating the first web contents to be displayed after login to the printing apparatus, information indicating the second web contents to be displayed when the printing apparatus performs printing and information indicating the third web contents to be displayed after logout of the printing apparatus;
detecting one of a login event of the printing apparatus, a print start event of the printing apparatus, and a logout event of the printing apparatus;
in a case where the detected event is the login event of the printing apparatus, based on the registered information indicating the first web contents, acquiring the first web contents and displaying a first screen including the acquired first web contents and not including an object for giving an instruction to redisplay of web contents;
in a case where the detected event is the print start event of the printing apparatus, based on the registered information indicating the second web contents, acquiring the second web contents and displaying a second screen including the acquired second web contents and not including an object for giving an instruction to redisplay of web contents;
displaying a main menu screen including an object for giving an instruction to redisplay web contents and an object for using a function of the printing apparatus in response to closing of the first screen including the first web contents or the second screen including the second web contents after displaying the first screen including the first web contents or the second screen including the second web contents;
redisplaying, which were displayed immediately before redisplay, and not displaying web contents, which were not displayed immediately before redisplay, in response to selection of the object for giving the instruction to redisplay the web contents included in the main menu screen,
in a case where the detected event is the logout event of the printing apparatus, acquiring the third web contents and displaying a third screen including the acquired third web contents and not including the object for giving the instruction to redisplay the web contents based on the registered information indicating the third web contents; and
displaying a screen displayed before the login to the printing apparatus in response to closing of a third screen including the third web contents after displaying the third screen including the third web contents,
wherein, in a case where the main menu screen is displayed by closing a first screen including the first web contents and where the object for giving the instruction to redisplay the web contents included in the main menu screen is selected, the contents that are redisplayed as the last-displayed contents are the first web contents, and
wherein, in a case where the main menu screen is displayed by closing a second screen including the second web contents and where the object for giving the instruction to redisplay the web contents included in the main menu screen is selected, the contents that are redisplayed as the last-displayed contents are the second web contents.

15. A printing apparatus comprising:
a memory; and
at least one processor in communication with the memory which executes the following:
holding a setting screen for setting first web contents to be displayed after login to the printing apparatus, second web contents to be displayed when the printing apparatus starts printing, and third web contents to be displayed after logout of the printing apparatus;
detecting one of a login event of the printing apparatus, a print start event of the printing apparatus, and a logout event of the printing apparatus;
in a case where the detected event is the login event of the printing apparatus, based on the registered information indicating the first web contents, acquiring the first web contents and displaying the acquired first web contents;
in a case where the detected event is the print start event of the printing apparatus, based on the registered information indicating the second web contents, acquiring the second web contents and displaying the acquired second web contents;
in a case where the detected event is the logout event of the printing apparatus, based on the registered information indicating the third web contents, acquiring the third web contents and displaying the acquired third web contents;
displaying a main menu screen including an object for giving an instruction to redisplay web contents and an object for using a function of the printing apparatus in response to closing of a first screen including the first web contents or a second screen including the second web contents after displaying the first web contents or the second web contents;
redisplaying web contents, which were displayed immediately before redisplay, and not displaying web contents, which were not displayed immediately before redisplay, in response to selection of the object for giving the instruction to redisplay the web contents included in the main menu screen;

acquiring the third web contents and displaying the acquired third web contents based on the registered information indicating the third web contents in a case where the detected event is the logout event of the printing apparatus; and displaying a screen displayed before the login to the printing apparatus in response to closing of a third screen including the third web contents after displaying the third web contents, wherein, in a case where the main menu screen is displayed by closing a first screen including the first web contents and where the object for giving the instruction to redisplay the web contents included in the main menu screen is selected, the contents that are redisplayed as the last-displayed contents are the first web contents, and wherein, in a case where the main menu screen is displayed by closing a second screen including the second web contents and where the object for giving the instruction to redisplay the web contents included in the main menu screen is selected, the contents that are redisplayed as the last-displayed contents are the second web contents.

* * * * *